United States Patent
Howden

(10) Patent No.: US 7,469,660 B1
(45) Date of Patent: Dec. 30, 2008

(54) COMBINED DWELLING AND PLAY AREA FOR CATS AND LIKE FELINE ANIMALS

(76) Inventor: Annie Howden, 31 Greenknoll, Honover, MD (US) 21076

( * ) Notice: Subject to any disclaimer, the term of this patent is extended or adjusted under 35 U.S.C. 154(b) by 129 days.

(21) Appl. No.: 11/496,794

(22) Filed: Aug. 1, 2006

Related U.S. Application Data

(60) Provisional application No. 60/704,175, filed on Aug. 1, 2005.

(51) Int. Cl.
*A01K 15/02* (2006.01)

(52) U.S. Cl. ............... 119/702; 119/706

(58) Field of Classification Search ......... 119/416, 119/702, 706–711, 496, 28.5, 452–454, 475, 119/482, 61.5, 61.57, 61.56; D30/108, 119, D30/160, 109, 118, 129; 446/227
See application file for complete search history.

(56) References Cited

U.S. PATENT DOCUMENTS

| | | | | |
|---|---|---|---|---|
| 3,749,063 A | * | 7/1973 | Buffum | 119/61.56 |
| D261,186 S | * | 10/1981 | Michalski | D30/160 |
| 4,335,679 A | * | 6/1982 | Carlin | 119/165 |
| 4,790,265 A | * | 12/1988 | Manson | 119/706 |
| 5,050,536 A | | 9/1991 | Baker | |
| 5,184,568 A | | 2/1993 | Healey | |
| 5,465,682 A | * | 11/1995 | Chavallo, Jr. | 119/498 |
| 5,577,466 A | * | 11/1996 | Luxford | 119/706 |
| 5,782,374 A | * | 7/1998 | Walker | 220/23.87 |
| 5,806,464 A | * | 9/1998 | Willinger et al. | 119/706 |
| D406,678 S | * | 3/1999 | Rittenhouse | D30/108 |
| D422,754 S | * | 4/2000 | Kolozsvari et al. | D30/118 |
| 6,058,887 A | | 5/2000 | Silverman | |
| 6,378,463 B1 | * | 4/2002 | Simmons | 119/707 |
| 2002/0121243 A1 | | 9/2002 | Martyn | |
| 2003/0140869 A1 | * | 7/2003 | Rowe et al. | 119/708 |
| 2005/0120968 A1 | | 6/2005 | Dorsey | |
| 2007/0144447 A1 | * | 6/2007 | Dana et al. | 119/61.5 |

\* cited by examiner

*Primary Examiner*—Michael R Mansen
*Assistant Examiner*—Kristen C Hayes

(57) ABSTRACT

A combined dwelling and play area for cats and the like includes a base member that has an at least one spherical notch formed therein. The notch extends downwardly from a top surface and terminates above a bottom surface thereof. At least one saucer is seated within the at least one notch. A first housing is connected to the base member and has an open front face positioned along a longitudinal side thereof. A support shaft is conjoined to the housing and extends laterally outward therefrom. A plurality of novelty mobiles is tethered to the shaft and elevated above the base member. A vertically oriented scratch pole is coupled to the base member, and a pillow is seated within the housing. The scratch pole is spaced from the shaft and is statically coupled to a top surface of the base member.

14 Claims, 5 Drawing Sheets

COMBINED DWELLING AND PLAY AREA FOR CATS AND LIKE FELINE ANIMALS

CROSS REFERENCE TO RELATED APPLICATIONS

This application claims the benefit of U.S. Provisional Application No. 60/704,175, filed Aug. 1, 2005.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to portable pet shelters and, more particularly, to a combined dwelling and play area for cats and the like that provides a sleeping and playing area isolated from human contact.

2. Prior Art

Cats, and particularly cats contained within a dwelling, are typically afforded places to sleep, as well as scratching posts to distract cats from effecting such scratching on household furniture. Usually pets are accommodated in the owner's or caretakers living quarters, if they are tolerated in the living quarters at all, by a sleeping basket usually placed at some remote location so that it will not be tripped over or otherwise form an obstruction to the passage of the human occupant of the living quarters. They are single-purpose items and usually are unattractive so that the owner prefers that they be out of sight. They are provided as a rule with pillows or other bedding material. In addition, sometimes litter baskets or trays separate from the bedding arrangement have been suggested for use.

One prior art example shows a pet house which is usable for cats and dogs and the like in the personal living quarters of the owner or caretaker. The house is in the form of a piece of furniture which is opened when desired by unfolding a side or the top into a ramp which the pet may use to enter the sleeping compartment of the house. Unfortunately, this prior art example may be useless for older pets that may have difficulty climbing a ramp to enter the pet house, or climbing over the side of the pet house to exit. Additionally, if the ramp is closed, the pet may be effectively prevented from entering or leaving the pet house as needed.

Another prior art example shows a cat condominium or cat house and, more particularly, to a cat condominium which is made out of a rigid material such as wood and is disassembled by the removal of the shelves and folded flat for shipping or storage. Unfortunately, this prior art example must be assembled by the pet owner before it can be used. Additionally, the invention must be disassembled prior to moving the unit.

Accordingly, a need remains for a combined dwelling and play area for cats and the like in order to overcome the above-noted shortcomings. The present invention satisfies such a need by providing an assembly that is convenient and easy to use, is lightweight yet durable in design, and provides a pet with a convenient location in which to eat, sleep, and play. Such an assembly is portable, and contains all the necessities for a pets daily needs, with a sleeping area, play area, and feeding area all in one unit. The present invention is functional, attractive, and easy to clean and maintain.

BRIEF SUMMARY OF THE INVENTION

In view of the foregoing background, it is therefore an object of the present invention to provide an apparatus for a combined dwelling and play area for cats and the like. These and other objects, features, and advantages of the invention are provided by a portable animal shelter for providing cats a sleeping and playing area isolated from human contact.

The assembly conveniently includes a planar base member that has at least one spherical notch conveniently formed therein. Such a notch extends downwardly from a top surface and terminates above a bottom surface thereof. At least one saucer is removably seated within the at least one spherical notch in such a manner that a top lip of the at least one saucer effectively remains exposed above the top surface of the base member, which is advantageous for blocking a planar travel path thereover.

The assembly further includes a first housing directly connected to the base member that has an open front face conveniently positioned along a longitudinal side of the base member. A cylindrical support shaft is directly conjoined to the housing and extends laterally outward therefrom. Such a support shaft advantageously maintains a fixed spatial relationship with the base member and effectively travels parallel thereto. A plurality of novelty mobiles are conveniently tethered to the support shaft and are advantageously elevated above the base member.

The assembly still further includes a vertically oriented cylindrical scratch pole directly coupled to the base member, and a pillow conveniently and removably seated within the housing. Such a scratch pole is advantageously spaced from the support shaft for allowing a cat to freely rotate the mobiles about the support shaft without contacting the scratch pole. The scratch pole is statically coupled to a top surface of the base member and advantageously terminates at a height above the support shaft so that a cat can reach at least one of the mobiles during revolutionary movement about the support shaft.

The assembly preferably has at least one saucer that is conveniently seated adjacent to a proximal end of the base member. The scratch pole is seated at an axially opposed distal end of the base member, which is advantageous for preventing cat hair from depositing into the at least one saucer during grooming procedures. The assembly may also include a convenient second housing directly and statically coupled to the base member and advantageously spaced from the first housing. Such first and second housings are coextensively shaped.

The assembly may still further include a support shaft that has axially opposed ends directly and permanently mated with the first and second housings, which is advantageous for providing an elevated travel path therebetween. The assembly preferably also includes a top carpet layer directly abutted on the top surface of the base member. Such a carpet layer is contiguously laying along the base member and has a single and unitary body effectively traveling from the at least one saucer and beneath the housing wherein the carpet layer uniformly travels about an exterior surface of the scratch pole and terminates at the distal end of the base member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
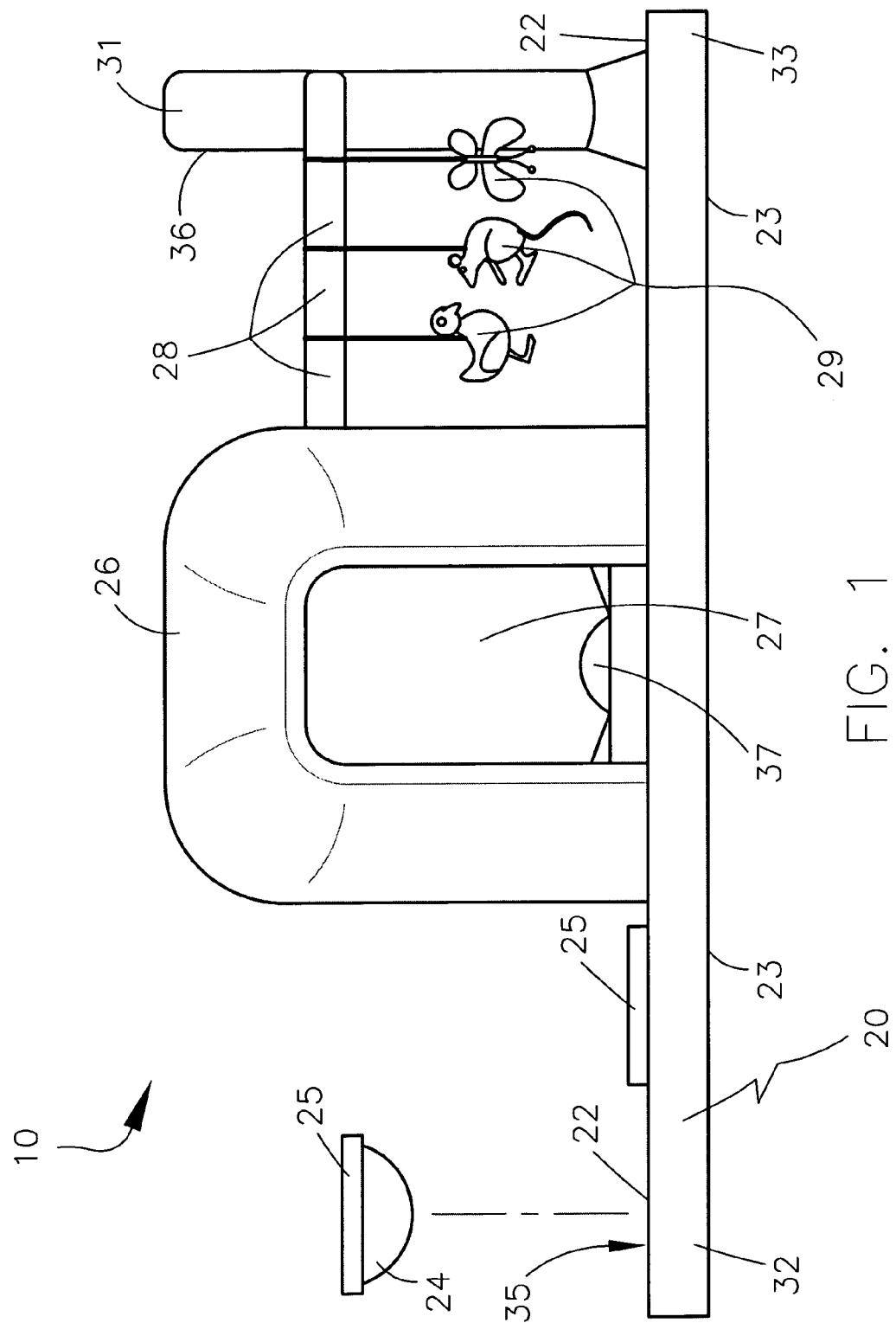
FIG. 1 is a front elevational view showing a combined dwelling and play area for cats and the like, in accordance with one embodiment of the present invention.
Figure 2:
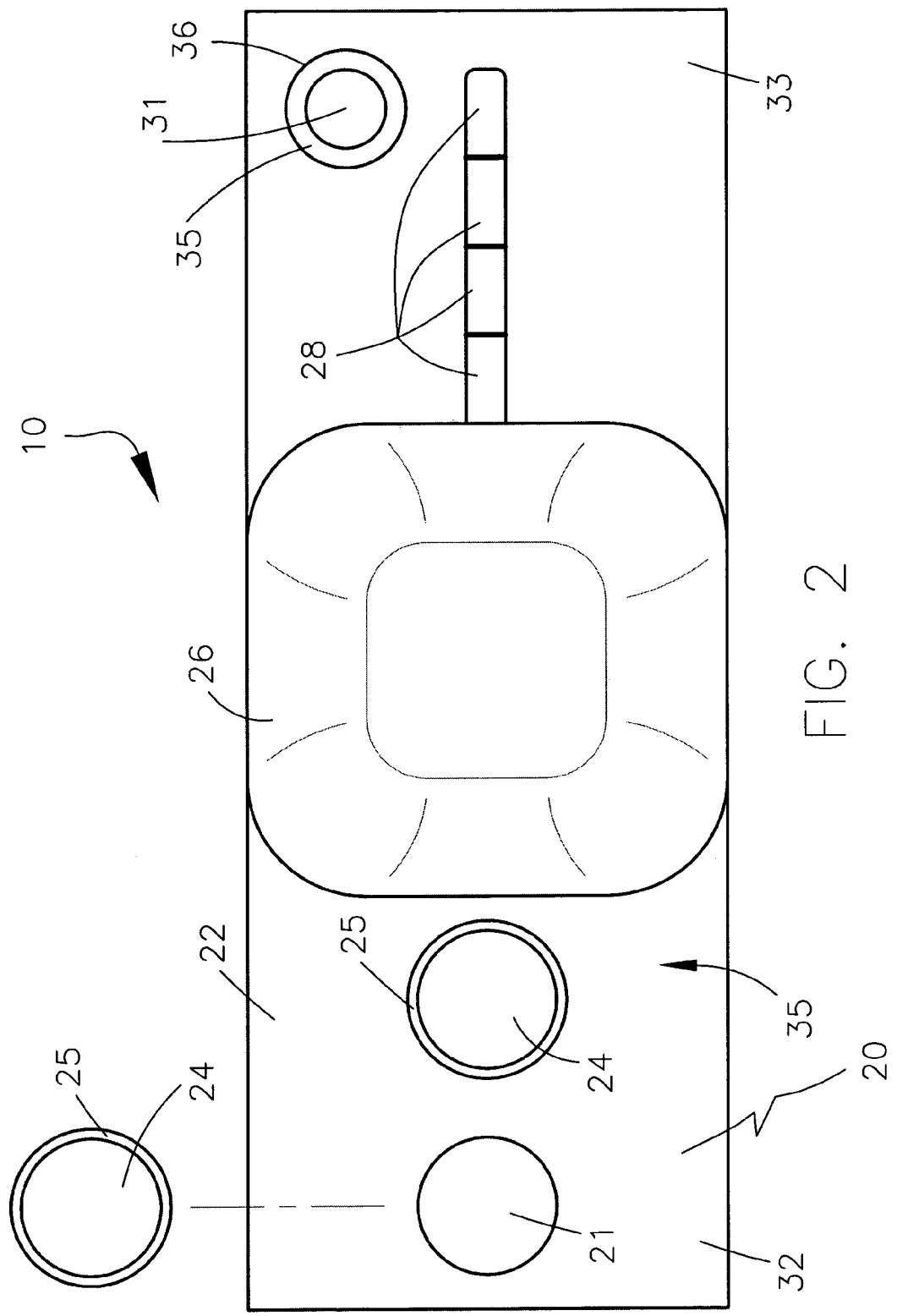
FIG. 2 is a top plan view of the assembly shown in FIG. 1.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1-5 by reference numerals 10 and 10' and is intended to provide a combined dwelling and play area for cats and the like. It should be understood that the assembly 10 may be used to provide a dwelling and play area for many different types of feline animals and should not be limited in use to providing a dwelling and play are for cats only.

Referring initially to FIGS. 1, 2, 3, 4 and 5, the assembly 10 and 10' conveniently includes a planar base member 20 that has at least one spherical notch 21 conveniently formed therein. Such a notch 21 extends downwardly from a top surface 22 and terminates above a bottom surface 23 thereof. At least one saucer 24 is removably seated within the at least one spherical notch 21 in such a manner that a top lip 25 of the at least one saucer 24 effectively remains exposed above the top surface 22 of the base member 20, which is advantageous for blocking a planar travel path thereover. The saucers preferably have bowl shapes for so that they can be easily removed from the respective notches and spun around their corresponding apexes when the cats have finished eating their meals.

Again referring to FIGS. 1 through 5, the assembly 10 and 10' has a first housing 26 directly connected, without the use of intervening elements, to the base member 20 that has an open front face 27 conveniently positioned along a longitudinal side of the base member 20. Of course, such a housing can be produced in a wide variety of sizes, shapes, and colors, as is obvious to a person of ordinary skill in the art. A cylindrical support shaft 28 is directly conjoined to the housing 26, without the use of intervening elements, and extends laterally outward therefrom. Such a support shaft 28 advantageously maintains a fixed spatial relationship with the base member 20 and effectively travels parallel thereto. It is critical for the support shaft 28 to be directly connected to housing 26 because the cats would otherwise not be able to walk along the entire length of the support shaft 28 without causing the support shaft 28 to become offset from a horizontal plane. A plurality of novelty mobiles 29 are conveniently tethered to the support shaft 28 and are advantageously elevated above the base member 20. Of course, such a plurality of mobiles can be produced in many different sizes, shapes, and colors, as is obvious to a person of ordinary skill in the art. The mobiles 29 are preferably connected via hook and loop fasteners so that the care giver can replace damaged mobiles 29 during extended periods of use.

Yet again referring to FIGS. 1 through 5, the assembly 10 and 10' further includes a vertically oriented cylindrical scratch pole 31 directly coupled to the base member, without the use of intervening elements, and a pillow 37 conveniently and removably seated within the housing 26. Of course, many different types of materials may be used as a pillow, as is obvious to a person of ordinary skill in the art. Such a scratch pole 31 is advantageously spaced from the support shaft 28 for allowing a cat to freely rotate the mobiles 29 about the support shaft 28 without contacting the scratch pole 31. The scratch pole 31 is statically coupled to a top surface 22 of the base member 20 and advantageously terminates at a height above the support shaft 28 so that a cat can reach at least one of the mobiles 29 during revolutionary movement about the support shaft 28. The specific shape of the scratch pole 31 is critical for allowing the cats to climb the pole and catch the mobiles 29 when they are spun about the support shaft 28.

Figure 3:
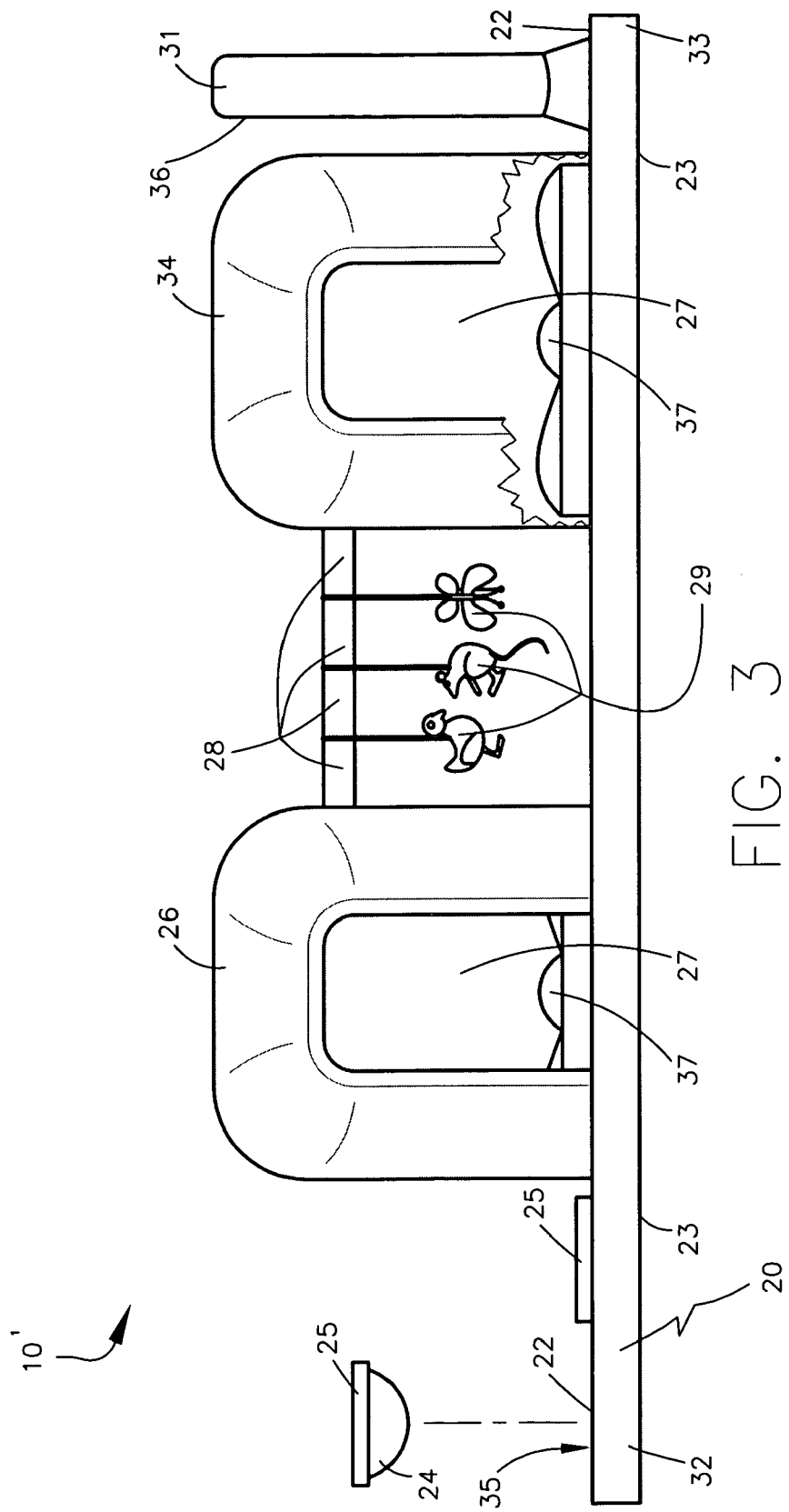
FIG. 3 is a front elevational view showing an alternate embodiment of the assembly shown in FIG. 1.
Figure 4:
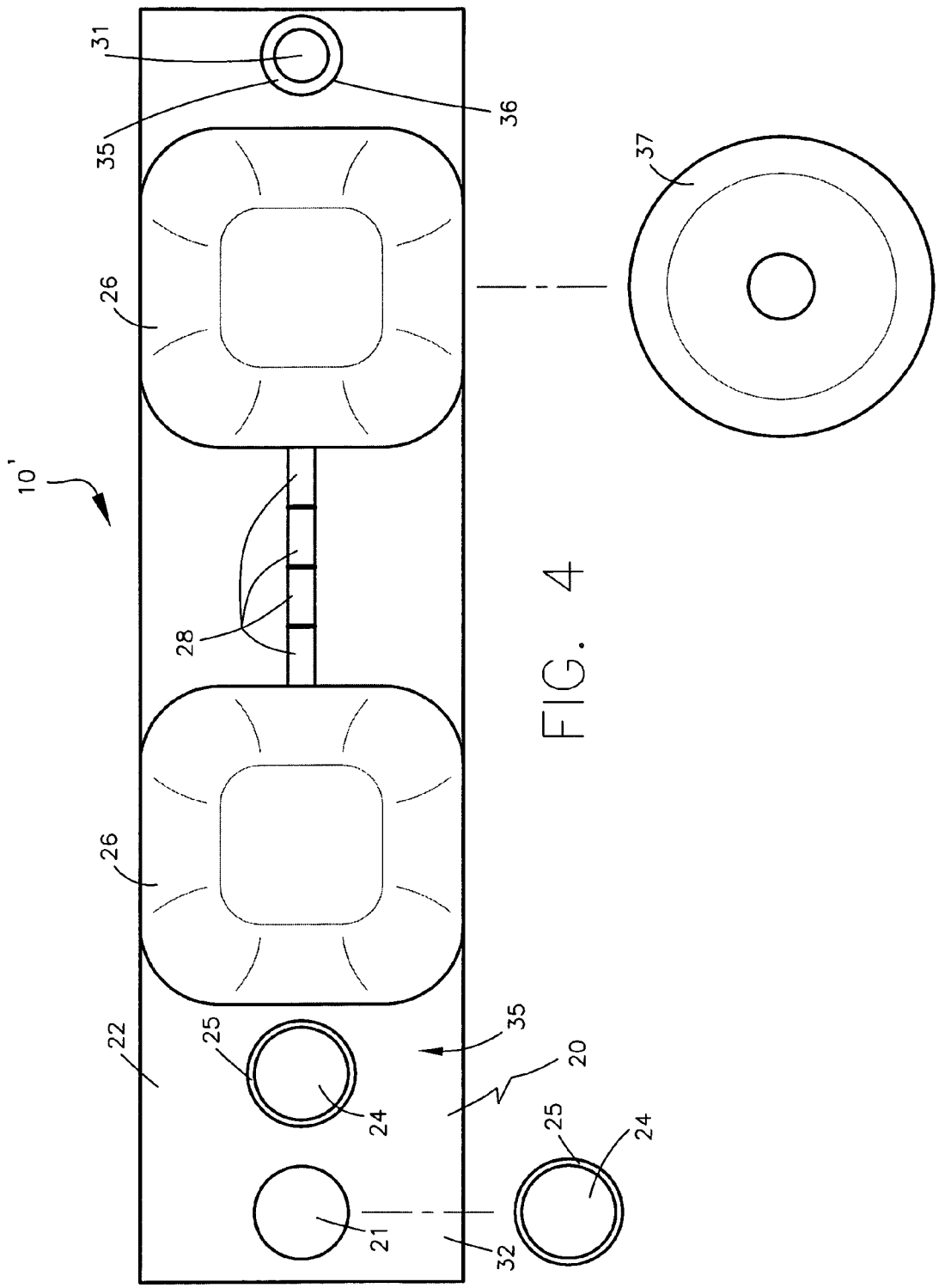
FIG. 4 is a top plan view of the alternate embodiment shown in FIG. 3.
Figure 5:
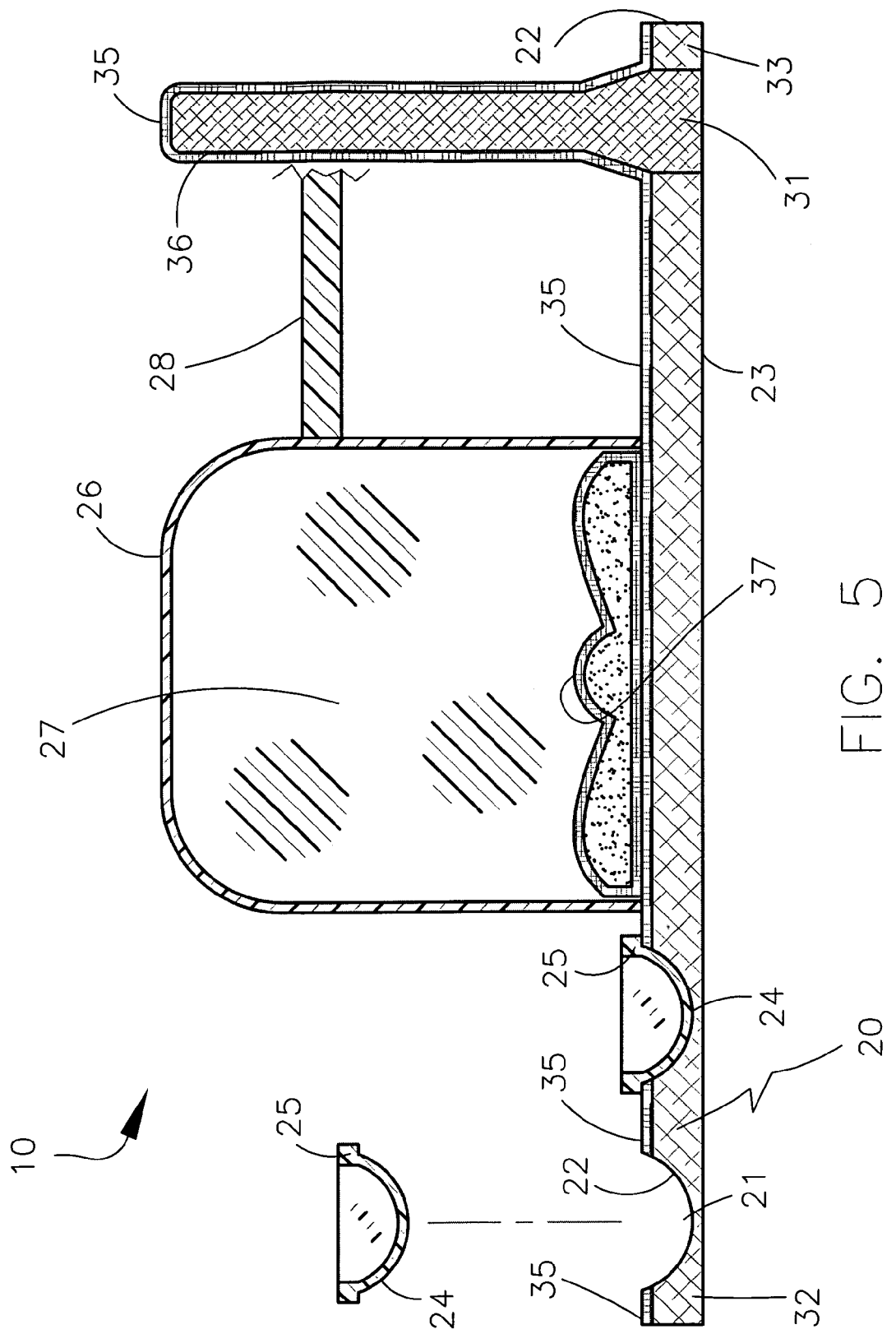
FIG. 5 is a cross-sectional view of the assembly shown in FIG. 1.

Referring to FIGS. 3 and 4, in an alternate embodiment, the assembly 10' has at least one saucer 24 that is conveniently seated adjacent to a proximal end 32 of the base member 20. The scratch pole 31 is seated at an axially opposed distal end 33 of the base member 20, which is advantageous and critical for preventing cat hair from depositing into the at least one saucer 24 during grooming procedures. If the scratch pole 31 were placed closer to the saucer 24, the food/water in the saucer 24 would become contaminated and reduce the effectiveness of the present invention. The assembly 10' also includes a convenient second housing 34 directly, without the use of intervening elements, and statically coupled to the base member 20 and advantageously spaced from the first housing 26. Such first 26 and second 34 housings are coextensively shaped for providing an equally effective sleeping area for different groups of cats.

Still further referring to FIGS. 3 and 4, the assembly 10' has a support shaft 28 that has axially opposed ends directly and permanently mated, without the use of intervening elements, with the first 26 and second 34 housings, which is advantageous for providing an elevated travel path therebetween. It is essential that the support shaft 28 is elevated above the base member for allowing the cats to travel from house 26 to house 34 without touching the carpet layer (described hereinbelow).

The assembly includes a top carpet layer 35 directly abutted, without the use of intervening elements, on the top surface 22 of the base member 20. Such a carpet layer 35 is contiguously laying along the base member 20 and has a single and unitary body effectively traveling from the at least one saucer 24 and beneath the first 26 and second 34 housing wherein the carpet layer 35 uniformly travels about an exterior surface 36 of the scratch pole 31 and terminates at the distal end 33 of the base member 20. It is essential and necessarily critical for the carpet layer to be seamless so that the cats do not fray or prematurely peel the carpet layer 35 away from the base member 20.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A portable animal shelter for providing cats a sleeping and playing area isolated from human contact, said portable animal shelter comprising:
   a planar base member having at least one spherical notch formed therein, said notch extending downwardly from a top surface and terminating above a bottom surface thereof;
   at least one saucer removably seated within said at least one spherical notch in such a manner that a top lip of said at least one saucer remains exposed above said top surface of said planar base member for blocking a planar travel path thereover;
   a first housing directly connected to said planar base member and having an open front face positioned along a longitudinal side of said planar base member;
   a cylindrical support shaft directly conjoined to said first housing and extending laterally outward therefrom;
   a plurality of novelty mobiles tethered to said cylindrical support shaft and elevated above said planar base member;
   a vertically oriented cylindrical scratch pole directly coupled to said planar base member; and
   a pillow removably seated within said first housing;
   wherein said scratch pole is spaced from said cylindrical support shaft for allowing a cat to freely rotate said mobiles about said cylindrical support shaft without contacting said scratch pole;
   wherein said first housing has a plurality of monolithically formed walls traveling along mutually exclusive planes and thereby defining a suitably sized and shaped cavity therebetween for housing the cats, said cavity extending upwardly from said top surface of said base member and terminating at a top one of said walls such that the cats are permitted to enter the cavity and rest on said pillow while being situated between said walls respectively.

2. The portable animal shelter of claim 1, wherein said at least one saucer is seated adjacent to a proximal end of said planar base member, said scratch pole being seated at an axially opposed distal end of said planar base member for preventing cat hair from depositing into said at least one saucer during grooming procedures.

3. The portable animal shelter of claim 2, further comprising: a top carpet layer directly abutted on said top surface of said planar base member, said top carpet layer contiguously laying along said planar base member and having a single and unitary body traveling from said at least one saucer and beneath said first housing wherein said top carpet layer uniformly travels about an exterior surface of said scratch pole and terminates at said distal end of said planar base member.

4. The portable animal shelter of claim 1, further comprising: a second housing directly and statically coupled to said planar base member and spaced from said first housing, said first and second housings being coextensively shaped.

5. The portable animal shelter of claim 4, wherein said cylindrical support shaft has axially opposed ends directly and permanently mated with said first and second housings for providing an elevated travel path therebetween.

6. A portable animal shelter for providing cats a sleeping and playing area isolated from human contact, said portable animal shelter comprising:
   a planar base member having at least one spherical notch formed therein, said notch extending downwardly from a top surface and terminating above a bottom surface thereof;
   at least one saucer removably seated within said at least one spherical notch in such a manner that a top lip of said at least one saucer remains exposed above said top surface of said planar base member for blocking a planar travel path thereover;
   a first housing directly connected to said planar base member and having an open front face positioned along a longitudinal side of said planar base member;
   a cylindrical support shaft directly conjoined to said first housing and extending laterally outward therefrom;
   a plurality of novelty mobiles tethered to said cylindrical support shaft and elevated above said planar base member;
   a vertically oriented cylindrical scratch pole directly coupled to said planar base member; and
   a pillow removably seated within said first housing;
   wherein said scratch pole is spaced from said cylindrical support shaft for allowing a cat to freely rotate said mobiles about said cylindrical support shaft without contacting said scratch pole;
   wherein said scratch pole is statically coupled to a top surface of said planar base member and terminates at a height above said cylindrical support shaft so that a cat can reach at least one of said mobiles during revolutionary movement about said cylindrical support shaft;
   wherein said first housing has front and rear upstanding sides situated along corresponding front and rear linear edges of said base member respectively.

7. The portable animal shelter of claim 6, wherein said at least one saucer is seated adjacent to a proximal end of said planar base member, said scratch pole being seated at an axially opposed distal end of said planar base member for preventing cat hair from depositing into said at least one saucer during grooming procedures.

8. The portable animal shelter of claim 7, further comprising: a top carpet layer directly abutted on said top surface of said planar base member, said top carpet layer contiguously laying along said planar base member and having a single and unitary body traveling from said at least one saucer and beneath said first housing wherein said top carpet layer uniformly travels about an exterior surface of said scratch pole and terminates at said distal end of said planar base member.

9. The portable animal shelter of claim 6, further comprising: a second housing directly and statically coupled to said planar base member and spaced from said first housing, said first and second housings being coextensively shaped.

10. The portable animal shelter of claim 9, wherein said cylindrical support shaft has axially opposed ends directly and permanently mated with said first and second housings for providing an elevated travel path therebetween.

11. A portable animal shelter for providing cats a sleeping and playing area isolated from human contact, said portable animal shelter comprising:

a planar base member having at least one spherical notch formed therein, said notch extending downwardly from a top surface and terminating above a bottom surface thereof;

at least one saucer removably seated within said at least one spherical notch in such a manner that a top lip of said at least one saucer remains exposed above said top surface of said planar base member for blocking a planar travel path thereover;

a first housing directly connected to said planar base member and having an open front face positioned along a longitudinal side of said planar base member;

a cylindrical support shaft directly conjoined to said first housing and extending laterally outward therefrom;

wherein said cylindrical support shaft maintains a fixed spatial relationship with said planar base member and travels parallel thereto;

a plurality of novelty mobiles tethered to said cylindrical support shaft and elevated above said planar base member;

a vertically oriented cylindrical scratch pole directly coupled to said planar base member; and a pillow removably seated within said first housing;

wherein said scratch pole is spaced from said cylindrical support shaft for allowing a cat to freely rotate said mobiles about said cylindrical support shaft without contacting said scratch pore;

wherein said scratch pole is statically coupled to a top surface of said planar base member and terminates at a height above said cylindrical support shaft so that a cat can reach at least one of said mobiles during revolutionary movement about said cylindrical support shaft;

a ton carpet layer directly abutted on said top surface of said planar base member, said top carpet layer contiguously laying along said planar base member and having a single and unitary body traveling from said at least one saucer and beneath said first housing wherein said top carpet layer uniformly travels about an exterior surface of said scratch pole and terminates at a distal end of said planar base member;

wherein said at least one saucer is formed from a material such that an outer-most circumferential wall of said at least one saucer maintains a fixed shape and remains disposed above said top surface of said base member.

12. The portable animal shelter of claim 11, wherein said at least one saucer is seated adjacent to a proximal end of said planar base member, said scratch pole being seated at an axially opposed distal end of said planar base member for preventing cat hair from depositing into said at least one saucer during grooming procedures.

13. The portable animal shelter of claim 11, further comprising: a second housing directly and statically coupled to said planar base member and spaced from said first housing, said first and second housings being coextensively shaped.

14. The portable animal shelter of claim 11, wherein said cylindrical support shaft has axially opposed ends directly and permanently mated with said first and second housings for providing an elevated travel path therebetween.

* * * * *